(12) United States Patent
Sallas

(10) Patent No.: US 8,773,950 B2
(45) Date of Patent: Jul. 8, 2014

(54) METHOD AND SEISMIC SOURCES WITH HIGH PRODUCTIVITY

(75) Inventor: John J. Sallas, Plano, TX (US)

(73) Assignee: Cggveritas Services SA, Massy Cedex (FR)

( * ) Notice: Subject to any disclaimer, the term of this patent is extended or adjusted under 35 U.S.C. 154(b) by 240 days.

(21) Appl. No.: 13/337,396

(22) Filed: Dec. 27, 2011

(65) Prior Publication Data

US 2013/0163381 A1    Jun. 27, 2013

(51) Int. Cl.
*G01V 1/00* (2006.01)

(52) U.S. Cl.
CPC ................................. *G01V 1/005* (2013.01)
USPC .............................................................. 367/41

(58) Field of Classification Search
USPC .............................................................. 367/41
See application file for complete search history.

(56) References Cited

U.S. PATENT DOCUMENTS

| | | | |
|---|---|---|---|
| 4,168,485 A | 9/1979 | Payton et al. | |
| 4,823,326 A | 4/1989 | Ward | |
| 4,953,657 A | 9/1990 | Edington | |
| 4,982,374 A | 1/1991 | Edington et al. | |
| 5,719,821 A | 2/1998 | Sallas et al. | |
| 5,721,710 A | 2/1998 | Sallas et al. | |
| 6,603,707 B1 | 8/2003 | Meunier et al. | |
| 7,859,945 B2 | 12/2010 | Sallas et al. | |
| 2003/0167127 A1* | 9/2003 | Becquey | 702/14 |
| 2008/0205193 A1* | 8/2008 | Krohn et al. | 367/38 |
| 2009/0010103 A1 | 1/2009 | Sallas et al. | |
| 2009/0323472 A1* | 12/2009 | Howe | 367/41 |
| 2010/0085836 A1* | 4/2010 | Bagaini et al. | 367/41 |
| 2011/0069741 A1* | 3/2011 | Erickson | 375/141 |

FOREIGN PATENT DOCUMENTS

| | | |
|---|---|---|
| EP | 1895328 A1 | 3/2008 |
| WO | 2005019865 A2 | 3/2005 |
| WO | 2006018728 A1 | 2/2006 |
| WO | 2008025986 A1 | 8/2006 |

OTHER PUBLICATIONS

International Search Report mailed on Jun. 12, 2013 and issued in related application No. PCT/EP2012/076900.
Written Opinion mailed on Jun. 12, 2013 and issued in related application No. PCT/EP2012/076900.

* cited by examiner

*Primary Examiner* — Isam Alsomiri
*Assistant Examiner* — Hovhannes Baghdasaryan
(74) *Attorney, Agent, or Firm* — Patent Portfolio Builders PLLC

(57) ABSTRACT

A method for seismic prospecting that includes a step of deploying plural vibratory sources on the ground; a step of receiving at each vibratory source a corresponding pilot signal for driving the vibratory source; a step of asynchronously actuating the vibratory sources to generate seismic waves into the ground; and a step of continuously recording seismic signals produced by the seismic waves. Pilot signals for the plural vibratory sources are obtained by spectrally shaping starting sequences into continuous pseudorandom sequences that are weakly correlated over a predetermined time interval.

16 Claims, 15 Drawing Sheets

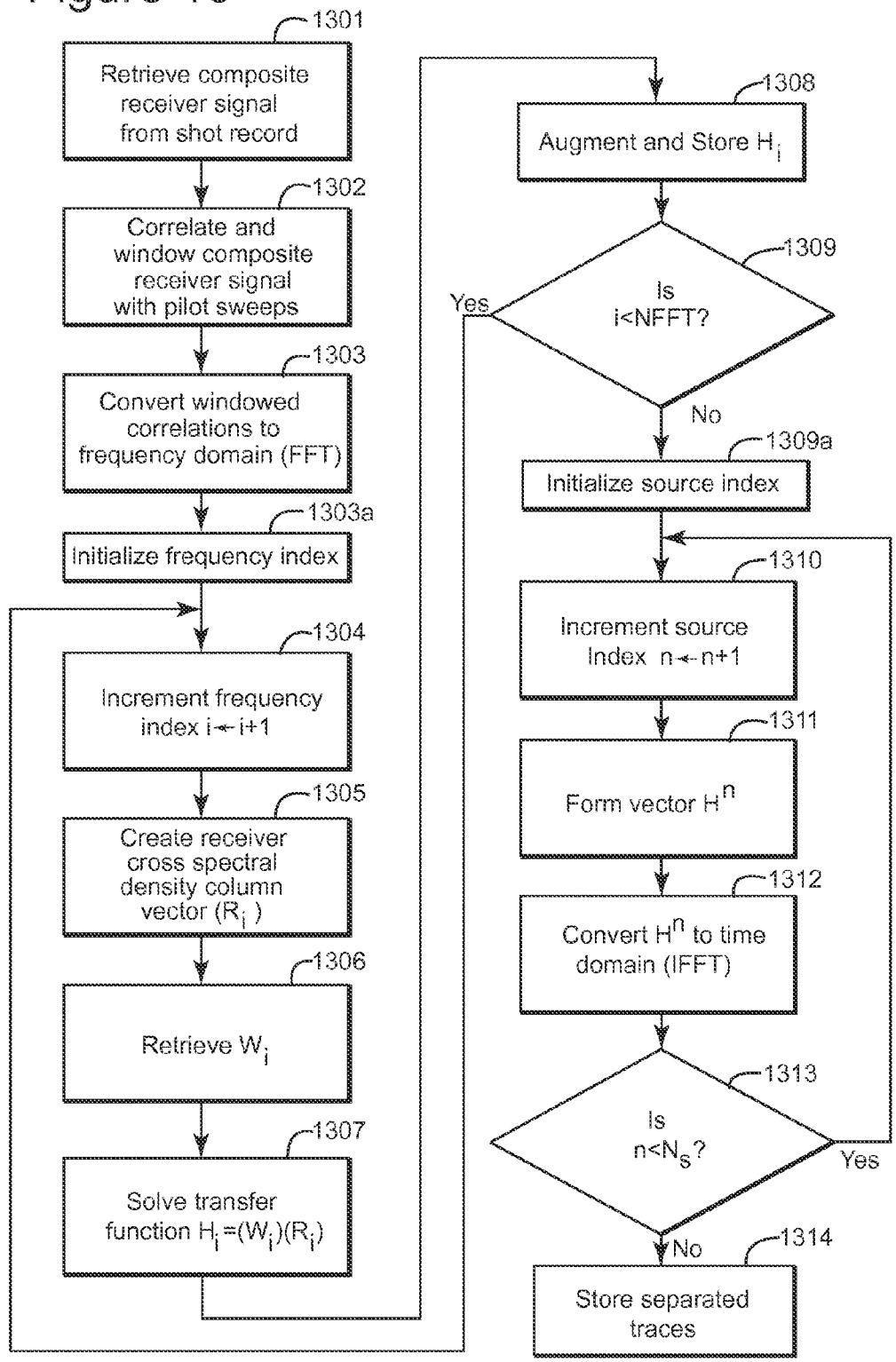

METHOD AND SEISMIC SOURCES WITH HIGH PRODUCTIVITY

BACKGROUND

1. Technical Field

Embodiments of the subject matter disclosed herein generally relate to methods and systems for generating, acquiring and processing land seismic data and, more particularly, to mechanisms and techniques for separating seismic signals generated by plural land seismic sources.

2. Discussion of the Background

Land seismic data acquisition and processing may be used to generate a profile (image) of the geophysical structure under the ground (subsurface). While this profile does not provide an accurate location for oil and gas reservoirs, it suggests, to those trained in the field, the presence or absence of such reservoirs. Thus, providing a high-resolution image of the subsurface is important, for example, to those who need to determine where oil and gas reservoirs are located.

Geophysical prospectors have found seismic vibrators to be useful signal sources for imaging the earth. Conventional seismic acquisition in the past generally employed multiple vibrators acting together and initiated simultaneously to form a source array. In land-based operations, the vibrators are positioned at a source location and synchronized to the same pilot sweep signal. Once activated, the vibrators generate a sweep that typically lasts between five and twenty seconds and typically spans a predetermined range of frequencies. A recording system that is connected to a plurality of receivers, typically geophones for land-based seismic exploration, is employed to receive and record the response data. For reflection seismology, the record length is typically set to equal the sweep length plus a listen time equal to the two-way travel time, which is the time required for the seismic energy to propagate from the source through the earth to the deepest reflector of interest and back to the receiver. The vibrators are then moved to a new source location and the process is repeated.

The conventional methods have a number of shortcomings some of which include: 1) intra-array statics because the vibrators are at different elevations or variations in the near surface that can affect source coupling to the earth; 2) spatial resolution issues due to array effects and limitation in source effort because of economic constraints; 3) control and synchronization problems associated with the use of multiple sources; and 4) mixed-phase data produced by the correlation process. Improvements in technology and reductions in the per channel cost of recording have resulted in an industry push toward using point source-point receiver methods to overcome some of the problems associated with source arrays and large receiver arrays. In land surveys today, the use of point receivers has rapidly increased productivity in deploying the receiver spread. As a result, the vibrators have become the weak link in achieving efficient field operations.

Over the years a number of methods have been introduced to address shortcomings with conventional seismic survey methods. One method, titled "Method for Continuous Sweeping and Separation of Multiple Seismic Vibrators," by Krohn and Johnson (WO/2005/019865), the entire disclosure of which is incorporated herein by reference, attempts to address the data quality and data acquisition issues. This method is an extension of the High Fidelity Vibratory System ("HFVS") originally developed by MOBIL and ARCO (see U.S. Pat. Nos. 5,719,821 and 5,721,710). The MOBIL-ARCO alliance developed a data acquisition and data processing technique that eliminates vibrator intra-array statics problems, mitigates vibrator control errors, provides minimum phase data, and provides high spatial resolution. However, in order to provide a cost effective method for effectively collecting point source data, a means to separate vibrators sweeping simultaneously was necessary.

Continuous HFVS is a new EXXON-MOBIL technique that combines a variation of the EXXON-MOBIL Cascaded Sweep technique and HFVS. By linking sweeps together with no listen time between segments, recording acquisition time is reduced. For example, a four vibrator implementation with four 12 second sweep segments and a five-second listen time and collected in one record has a total duration of 53 seconds. Compared to the 68-second duration in HFVS, this approach can result in a 22 percent timesaving. In practice, the record is processed by dividing the longer record into shorter records, and then conventional HFVS processing is performed.

However, the HFVS-methods have some technical drawbacks including: 1) low frequency noise in the inverted records because of an absence of low frequencies in the source signal; 2) not capturing all harmonic energy produced in the measured source signal; 3) a large data volume; 4) poor quality control because uncorrelated data is used ("shooting blind"); and 5) source outputs using phase offset encoding, resulting in highly correlated source signals that require reliable phase encoding for good separation.

The cost of seismic surveys depends heavily on the time required to collect the data. To reduce the acquisition time a number of methods have been devised over the years. Methods for source separation disclosed vibrator sources that are operated concurrently to reduce the time required for acquiring seismic survey data. For example, two groups of vibrators shooting into the same receiver spread at different offsets can be used to form a composite record. Most of those methods involve some form of swept sine wave source signal and rely on properties of the sweeps to be separated by correlation. Some methods rearrange portions of a conventional swept sine wave to mitigate crosstalk between surveys due to cross-correlation between the sweeps employed (see U.S. Pat. Nos. 4,168,485 and 4,982,374). Others achieve separation by using phase encoding schemes sometimes combined with up-sweeps and down-sweeps (see U.S. Pat. No. 4,823,326), others use time delays (see U.S. Pat. No. 4,953,657) and still others employ different sweep rates (see WO 2008/025986). Still others use techniques such as slip-sweep (see U.S. Pat. No. 6,603,707) that combine conventional swept sine waves, time delayed starts, and processing methods of F-T filtering, deconvolution, and migration to achieve separation (also see WO 2006/018728).

One such method, disclosed in U.S. Pat. No. 7,859,945 (herein '945), the entire content of which is incorporated herein by reference, implements a seismic acquisition using vibrators operating simultaneously. In this way, the time spent for the seismic survey is further reduced. The sweeps employed by the vibrators are based upon modified pseudo-random digital sequences. These sweep modifications include: 1) spectral reshaping, 2) cross-correlation suppression over a time window of interest, and 3) level compression to restore a favorable root mean square ("RMS") to peak amplitude level. The composite received signal reflected from the subsurface formations is correlated with the pilot sweep signals for preliminary separation. The individual responses of subsurface formations in the transmission path between each individual source and each seismic detector may be recovered, with the source signature removed.

However, there is a need to develop a method that is capable of simultaneously using multiple seismic vibrators while also reducing the constraints on the system configuration, e.g., relaxing starting times of the various vibratory sources.

SUMMARY OF THE INVENTION

According to an exemplary embodiment, there is a method for seismic prospecting. The method includes a step of deploying plural vibratory sources on the ground; a step of receiving at each vibratory source a corresponding pilot signal (A) for driving the vibratory source; a step of asynchronously actuating the vibratory sources to generate seismic waves into the ground; and a step of continuously recording seismic signals produced by the seismic waves. Pilot signals (A-D) for the plural vibratory sources are obtained by spectrally shaping starting sequences into continuous pseudorandom sequences that are weakly correlated over a predetermined time interval.

According to another exemplary embodiment, there is a controller configured to control a vibratory source deployed on the ground for seismic prospecting. The controller includes an interface configured to receive a corresponding pilot signal for driving the vibratory source; and a processor connected to the interface. The processor is configured to asynchronously actuate the vibratory source to generate seismic waves into the ground. The pilot signal for the vibratory source is obtained by spectrally shaping a corresponding starting sequence and other starting sequences associated with other vibrators into continuous pseudorandom sequences that are weakly correlated over a predetermined time interval.

According to still another exemplary embodiment, there is a computer readable medium including computer executable instructions, wherein the instructions, when executed by a processor, implement a method for seismic prospecting as noted above.

BRIEF DESCRIPTION OF THE DRAWINGS

For a more complete understanding of the present invention, reference is now made to the following descriptions taken in conjunction with the accompanying drawings, in which:

FIG. 13 is a flowchart showing the final separation process.

DETAILED DESCRIPTION OF THE INVENTION

Figure 1:
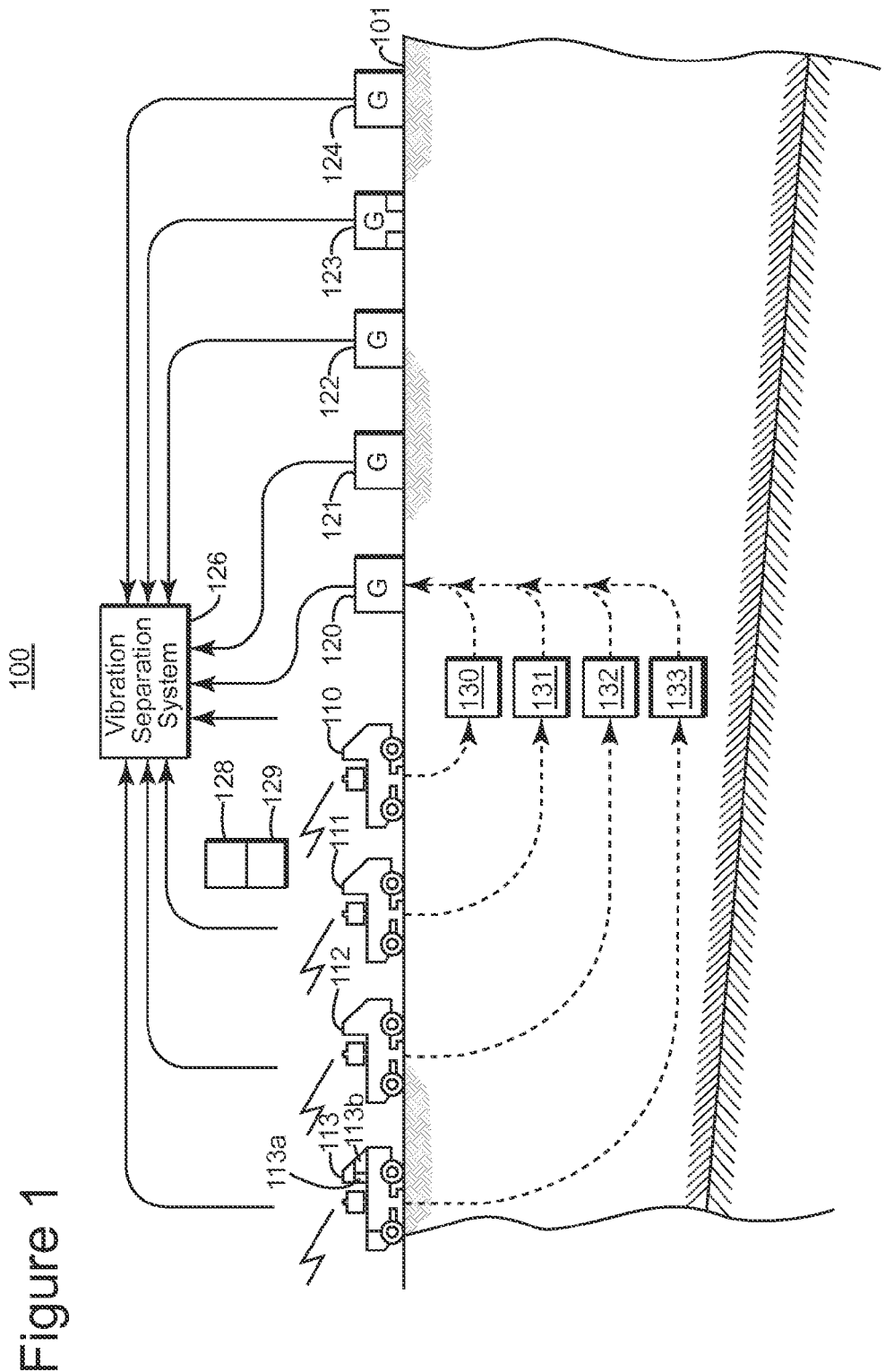
FIG. 1 illustrates a field seismic survey according to an exemplary embodiment.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a land seismic system that includes four vibratory sources. However, the embodiments to be discussed next are not limited to four vibratory sources or to a land seismic system. The novel features may be applied to marine seismic sources as well.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an exemplary embodiment, there is a method for operating in parallel vibratory sources so that they do not have to start their sweep at the same time. In one application, a vibratory source is configured to start its sweep whenever it is ready and does not have to wait for or coordinate with the other vibratory sources. In this way, the vibratory source can perform its sweep and then move to a new location to perform a next sweep without wasting any time. Also, the vibratory source may move to the new location while the other vibratory sources are still actuated. The seismic recorders may be configured to continuously record the data from the vibratory sources. Each vibratory source may be provided with a pilot signal sequence that has the cross-talk minimized with the other sources. The sequences for all the vibratory sources are synchronized with respect to one another at all times and run continuously. Each vibratory source taps into its particular sequence when it is ready and sweeps for a time equal to or less than the original sequence length. Thus, the start time is arbitrary with respect to the other sources and with respect to its master sweep sequence.

These novel features of the vibratory sources make them time efficient, i.e., the entire seismic survey can be performed with increased productivity as each source is not time constrained by the other sources. The above-noted novel method is now discussed in more detail.

Consider the configuration of a system 100 for land generating and collecting seismic data. In this regard, the exemplary survey system 100 shown in FIG. 1 includes four vibrators 110, 111, 112, and 113 placed at the surface of the earth 101. Vibrators 110, 111, 112, and 113 may be conventional truck-mounted vertical P-wave vibrators; however, it is understood that other vibrators, such as horizontal shear-wave vibrators, may be utilized or even a mixture of both P-wave and shear wave vibrators. The deployment of the vibrators may vary widely depending upon the survey requirements. For example, for a 3-D survey the vibrators may be spaced far apart and not collinear with one another.

Each vibrator may be equipped with a sweep generator module and control system electronics. For example, FIG. 1 shows vibrator 113 having the sweep generator module 113*a* and the control system electronics 113*b*. After receiving a start command, for example, initiated via a telemetry link with the recording system or by the operator of the vibrator, each vibrator begins sweeping. As discussed above, the vibrators are not coordinated to sweep simultaneously, which is different from many existing methods. Each vibrator sweep generator may be loaded with a unique pilot signal and therefore generates a unique band limited pseudorandom seismic signal. In one application, the vibrator sweep generator receives its corresponding pilot signal from a central controller 129. Thus, the pilot signal may be generated locally or centrally.

Sensors (not shown) attached to vibrators 110, 111, 112, and 113 are connected to a vibrator separation system 126. The sensors can be motion sensors, such as accelerometers mounted to the reaction mass, the base plate of the vibrator, or the earth immediately adjacent to the vibrator, a transducer or combination of transducers configured to measure the differential pressure in the actuation chamber of the vibrator, a load cell attached to the bottom of the base plate for measurement of the ground force (contact force), or a weighted sum of the base plate and the reaction mass accelerometers useful for estimating the ground force. Additionally, the sensor could comprise strain gauges mounted on the driven structure of the vibrator to provide an estimate of the ground force. Thus, these sensors provide the ground force signals to the vibrator separation system 126.

Alternatively, (i) the pilot or reference signal generated by the vibrator controller that the vibrator output follows or (ii) a Kalman filter estimate of the ground force provided by the vibrator controller (e.g., available from Sercel, Inc., Houston, Tex.) can be utilized for the sensor movement or (iii) another signal that is representative of the signal imparted into the earth, for example the base plate accelerometer signal. The sensor measurement, or some filtered version of the sensor measurement, is the measured signal and represents the actual source vibration imparted to the earth by the vibrator. In this respect it is noted that while the vibrator follows a pilot signal, the output of the vibrator (the sweep) may deviate from the pilot signal. The measured signals may be transmitted to a recording system 128 by hardwired link, a radio telemetry link, or by a separate acquisition system that records and stores the measured signals so that the measured signals can be integrated with the acquired seismic data set at a later time. The recording system 128 may be implemented in the same hardware as the central controller 129.

Receiver sensors, geophones in this example, 120, 121, 122, 123, and 124 are positioned at the surface of the earth 101 in the survey region at locations displaced from the vibrator position. The receiver sensors may be conventional moving coil type geophones, Micro Electro-Mechanical System (MEMS) sensor elements, or hydrophones for transition zone areas like marshes. In some areas, a receiver sensor may include a group of receiver sensors arranged as a receiver array to help attenuate ground roll or other noise modes. Receiver sensors are not limited to vertical component type sensors; horizontal geophones and 3-C geophones/accelerometers may also be used depending upon the nature of the survey to be conducted. For simplicity, 120, 121, 122, 123, and 124 will be considered single component vertical geophones configured to function as point receivers in this discussion.

The vibrator measured signals and composite received signals are typically minimum phase relatives of the actual vibrations they are designed to measure and represent the actual energy being radiated or received.

As shown in FIG. 1, vibratory energy radiated by each vibrator 110, 111, 112, and 113 travels through the earth from each vibrator to the receiver sensors 120, 121, 122, 123, and 124 in the survey area. The vibratory signal received by each receiver sensor will actually be a composite signal comprised of contributions from each vibratory source. Transfer functions 130, 131, 132, and 133 represent the transmission path response from vibrator 110, 111, 112, and 113 to receiver sensor 120 respectively. The transfer function will depend upon the vibratory signal radiated by each vibrator, the refraction and reflection by the subterranean formations of the vibratory source energy, and the response of the receiver sensor. Subsequent processing steps can be used to remove the embedded response due to the choice of source measured signal and receiver response.

The use of single sweeps executed in parallel or near parallel, as will be discussed later, in the vibratory survey provides a reduction in the time required for the survey. Since each receiver sensor recording is a composite seismic record containing a superposition of the contributions of each vibrator source, the vibrator separation system 126 is configured to separate the composite record. The vibrator separation system 126 has access to records of the pilot sweeps, the measured signals, and the composite received signal. This access can be in almost real time through the recording system or via recordings collected earlier and processed on a separate workstation computer. The separation system 126 may be implemented together with units 128 and 129 in the same hardware or can be separate.

Figure 2:
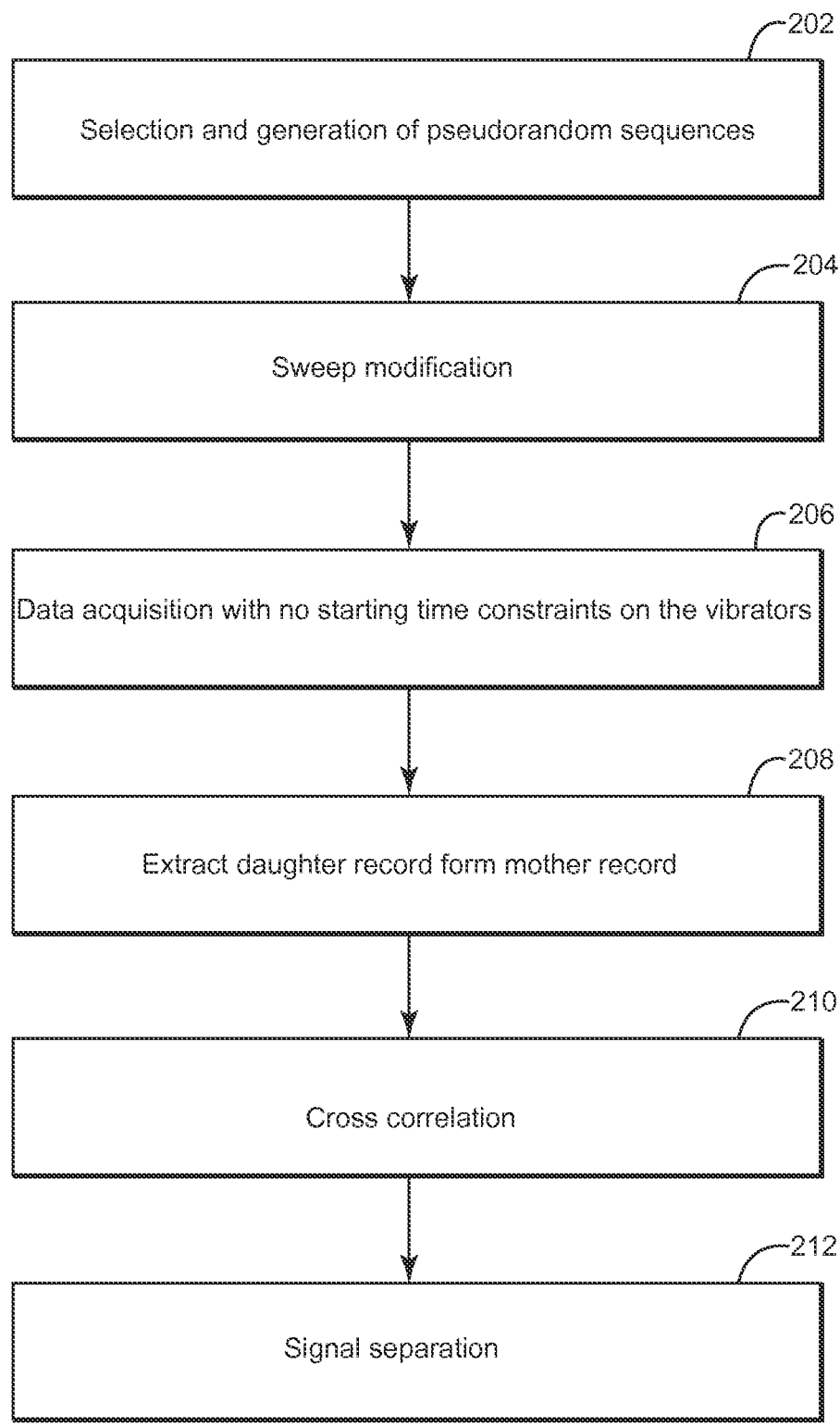
FIG. 2 is a flow chart illustrating a method for generating control signals, collecting and processing seismic data according to an exemplary embodiment.

According to an exemplary embodiment, the novel method may be implemented as illustrated in FIG. 2. The method includes a step 202 for selecting and generating weakly correlated pseudorandom binary sequences; a step 204 of sweep modification; a step 206 of data acquisition that includes starting the vibrators with no time constraints; a step 208 for extracting a daughter record from a mother record (discussed later); a step 210 of cross-correlating the recorded data with pilots; and a step 212 of signal separation with source signature removal. These steps are discussed in detail below.

Selection and Generation of Pseudorandom Starting Sequences

Step 202 includes the selection and generation of weakly correlated Pseudorandom Binary Sequences (PRBS). PRBS of maximal length, also known as Galois sequences, can be generated from irreducible, or primitive, polynomials. With pseudorandom signals there is no temporal separation of spectral content as might occur in swept sine wave type sweeps. It is noted that the choice of using Galois sequences or even binary sequences as a starting point is not required. Any set of random signals, continuous or binary, can be used for the starting point, and after sufficient iterations through the sweep modification process described in the next section, a set of suitable pilot sweeps can be produced that are weakly correlated over a time interval of +/−listen time. Thus, reference to binary sequences in this or other exemplary embodiments is for illustrative purposes only. The novel features to be discussed next apply to pilot sweeps in general and to pilot sweeps that are weakly correlated over a time interval that includes the listen time in particular.

Additionally, spreading out the spectral content of the sweep, rather than being concentrated for only a portion of the sweep, reduces the temporal peak energy of a given spectral element. Thus, structural resonances are not excited and windows on nearby structures are not rattled as badly as with swept sine waves. A large collection of sequences known as Gold codes can be generated from special pairs of irreducible polynomials of the same order called preferred pairs and used as starting sequences. These Gold codes have desirable characteristics, one of which includes low cross-correlations among the sequences. In one exemplary embodiment, a pseudorandom number generator is used to generate the PRBS. One pseudorandom number generator that can generate very long PRBS is a linear feedback shift register LFSR, which is discussed in details in '945.

For example, consider a survey that requires a 50 second sweep with a sweep full-power bandwidth from about 10 Hz to about 100 Hz and low frequency below 10 Hz down by 3 dB at 5 Hz to recover the deepest reflection energy having a two-way travel time, or listen time, of eight seconds. Using the seismic survey described in FIG. 1, a suite of PRBS needs to be generated as a starting point for the sweep modification algorithm. Typically, in point source acquisition longer sweeps are used than for acquisition using source arrays to compensate for the reduction in source energy per shot point. There is, however, an upper limit on sweep length that is determined in part by the maximum sweep length supported by the vibrator sweep generator, typically 60s. Of course, there is a tradeoff between signal to noise and productivity, so for productivity reasons it is desirable to not sweep any longer than necessary to maintain a minimum signal to noise. For this case, a 14-bit generator having a maximal length of 16,383 samples with an initial update rate of 4 milliseconds should be adequate. With the 4-millisecond sample rate, Nyquist theory limits this generator to frequencies at half the sample frequency or half of 250 Hz or 125 Hz. At a 4-millisecond interval, the full overall sequence length would be 65.532 seconds; so the sequence length will be truncated to 50 seconds (a 12,500 sequence length). Typically the sequence is over sampled so that it is compatible with the sweep generator and vibrator controller, which is typically at a 0.5 ms sample rate before the sweep modification process.

Figure 3:
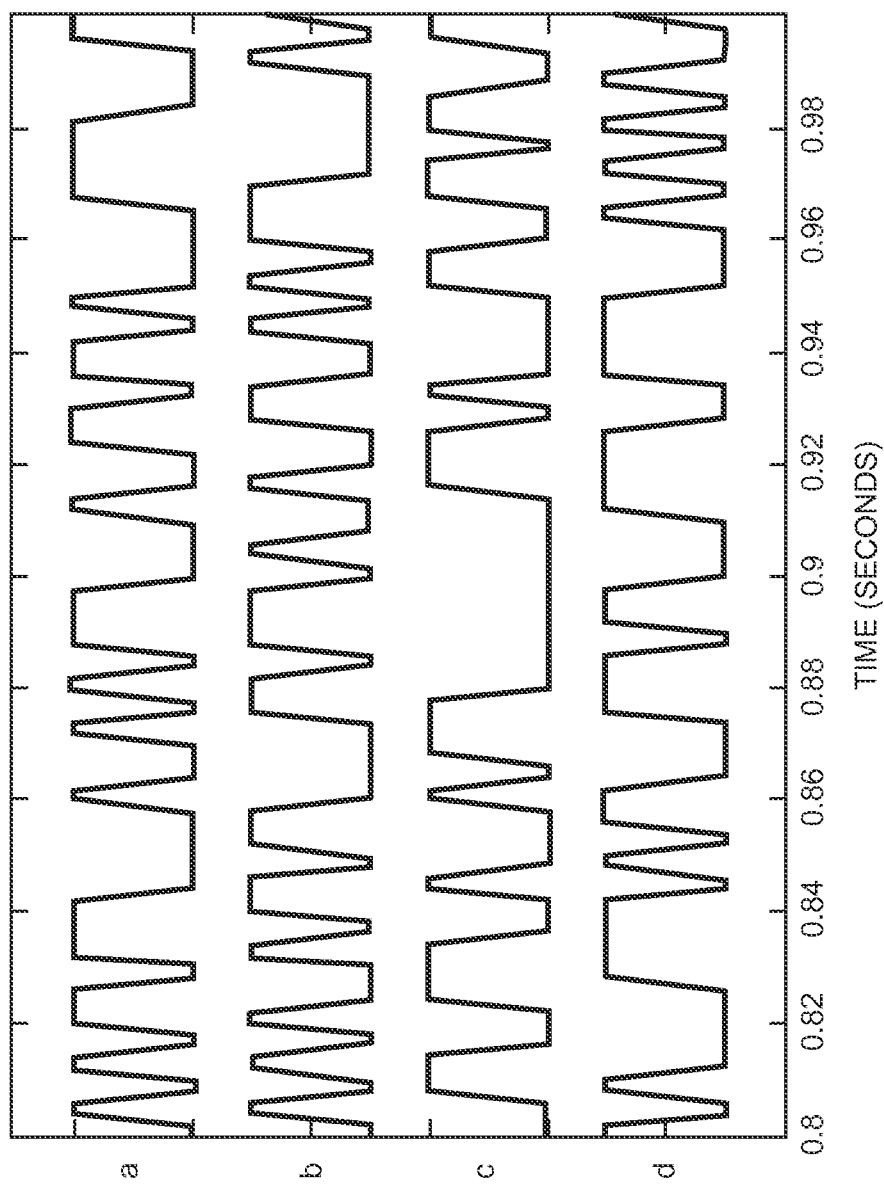
FIG. 3 illustrates a portion of four pseudorandom binary sequences.

For PRBS sequences, it is found that for each polynomial order of 12 or greater there is a "preferred pair" of primitive polynomials giving rise to sequences with a cross-correlation significantly less than that of other pairs of that order. By modulo-2 addition of the time shifts of each LFSR of the preferred pair, a large number of other sequences called Gold codes can be produced with similar cross-correlation properties. A selection process for identifying preferred pairs from the Peterson's Appendix C can be found in Dixon, R. C., SPREAD SPECTRUM COMMUNICATIONS 502 (1994). FIG. 3 shows an enlarged portion of the four PRBS sweep modification starting sequences with normalization and DC offset removed to center the waveform about zero. Again, the choice of using truncated Gold Code sequences is not critical or necessary; many unique suites of random signals whether binary or continuous can be used as a starting point for sweep modification.

Sweep Modification

Figure 4:
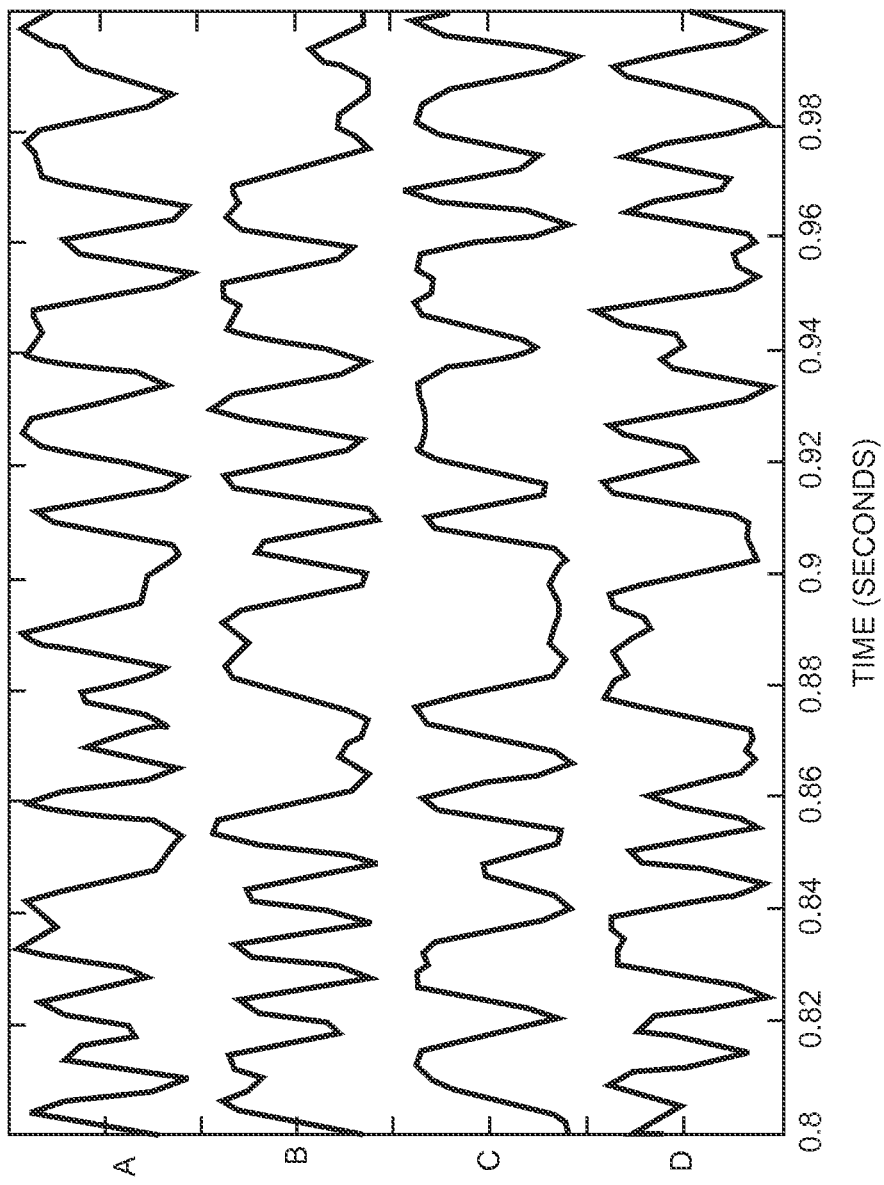
FIG. 4 illustrates a portion of the pilot signals A, B, C and D.
Figure 5:
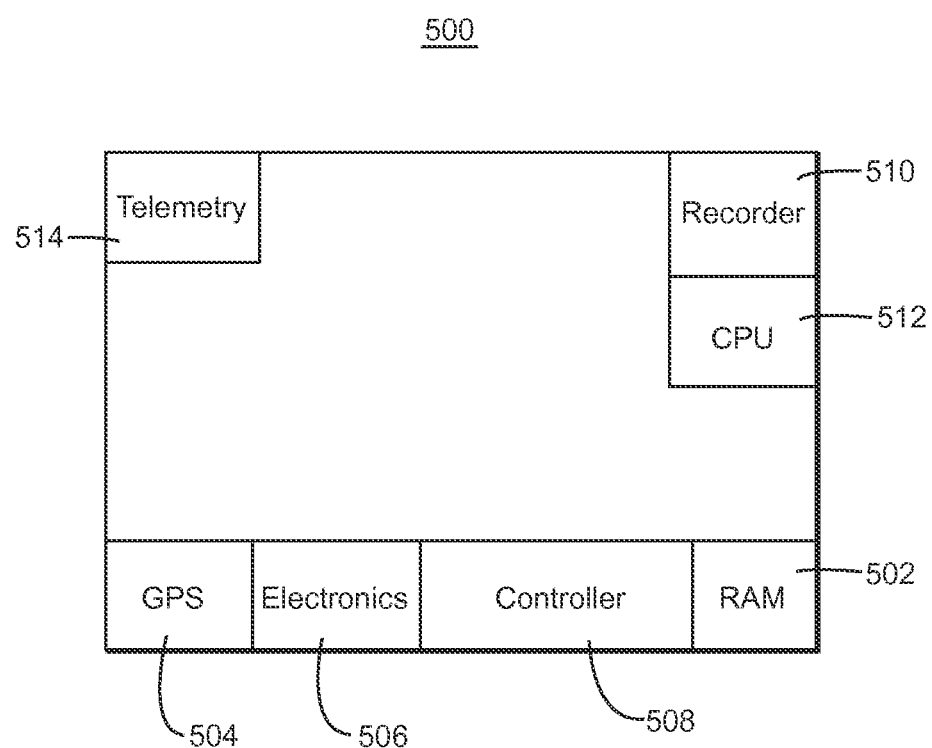
FIG. 5 is a schematic diagram of electronics of a vibratory source according to an exemplary embodiment.

A process for creating the set of "weakly correlated" pilot signals to be applied to the vibrators is fully described in '945 and corresponds to step 204 in FIG. 2. Thus, that process is not repeated in this document. FIG. 4, which corresponds to FIG. 9 of '945, shows portions of the four pilot signals A-D that are weakly correlated and ready to be applied to corresponding vibrators. Each pilot signal is stored in a memory 502 of a vibrator 500 illustrated in FIG. 5. Vibrator 500 may be any of the vibrators shown in FIG. 1.

Figure 6:
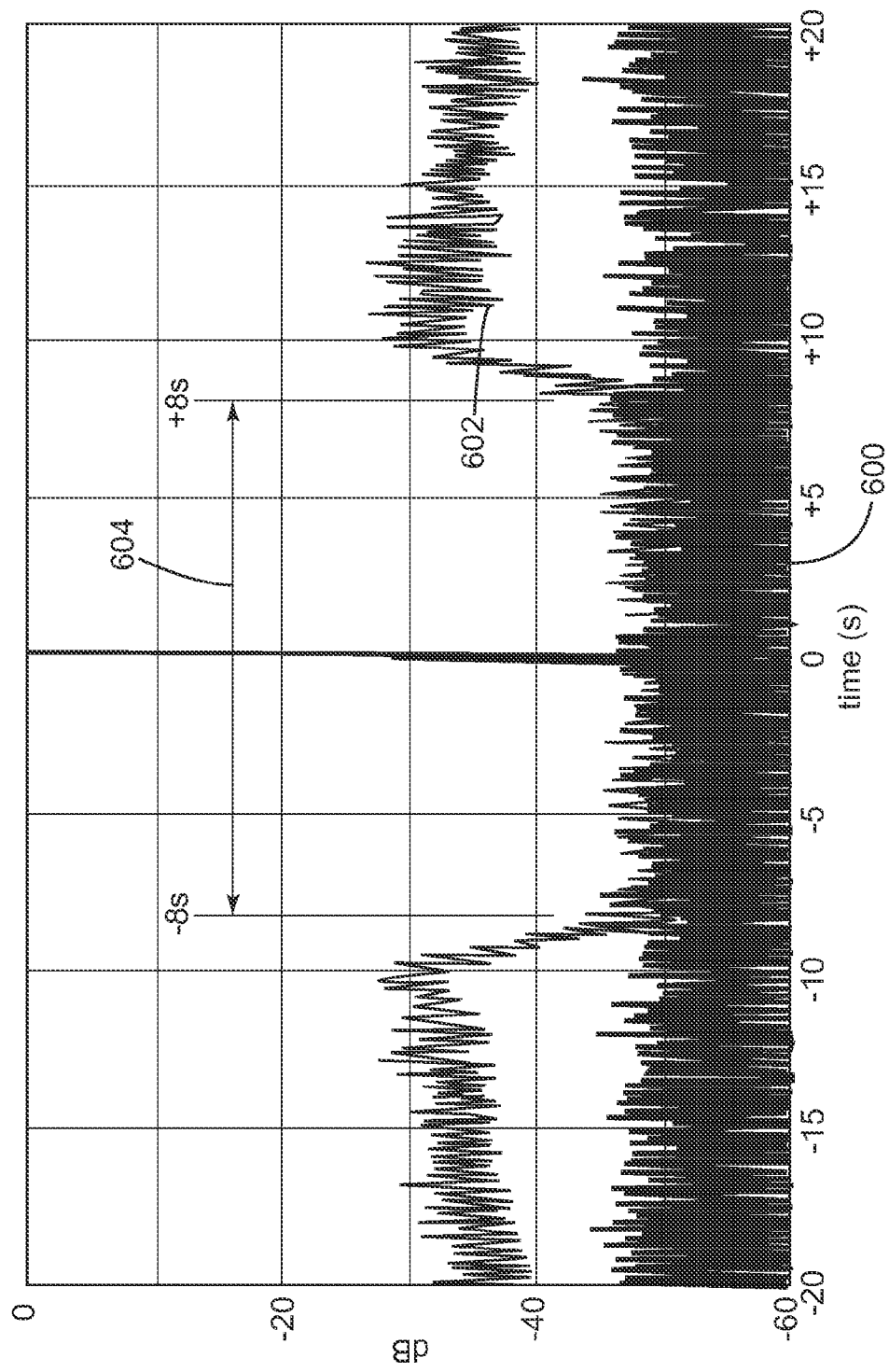
FIG. 6 is a magnitude graph of the autocorrelation of Pilot A and the cross correlation of Pilots B, C and D with Pilot A.

FIG. 6 illustrates the cross-talk suppression interval that is created by the sweep modifier. In this case, the pilot signals were designed for a listen time of 8 s. Curve 600 is the magnitude of the autocorrelation of pilot signal A in decibels. Curves 602 are the magnitudes of the cross correlation of pilot signals B, C and D with pilot A also displayed in decibels. For this case a cross-talk suppression interval 604 was created that extends over the range of [−8 s, +8 s] away from the zero lag of the autocorrelation of Pilot A. Note that cross-talk is suppressed by about 45 dB or more over the range of [−8 s, +8 s].

Figure 7:
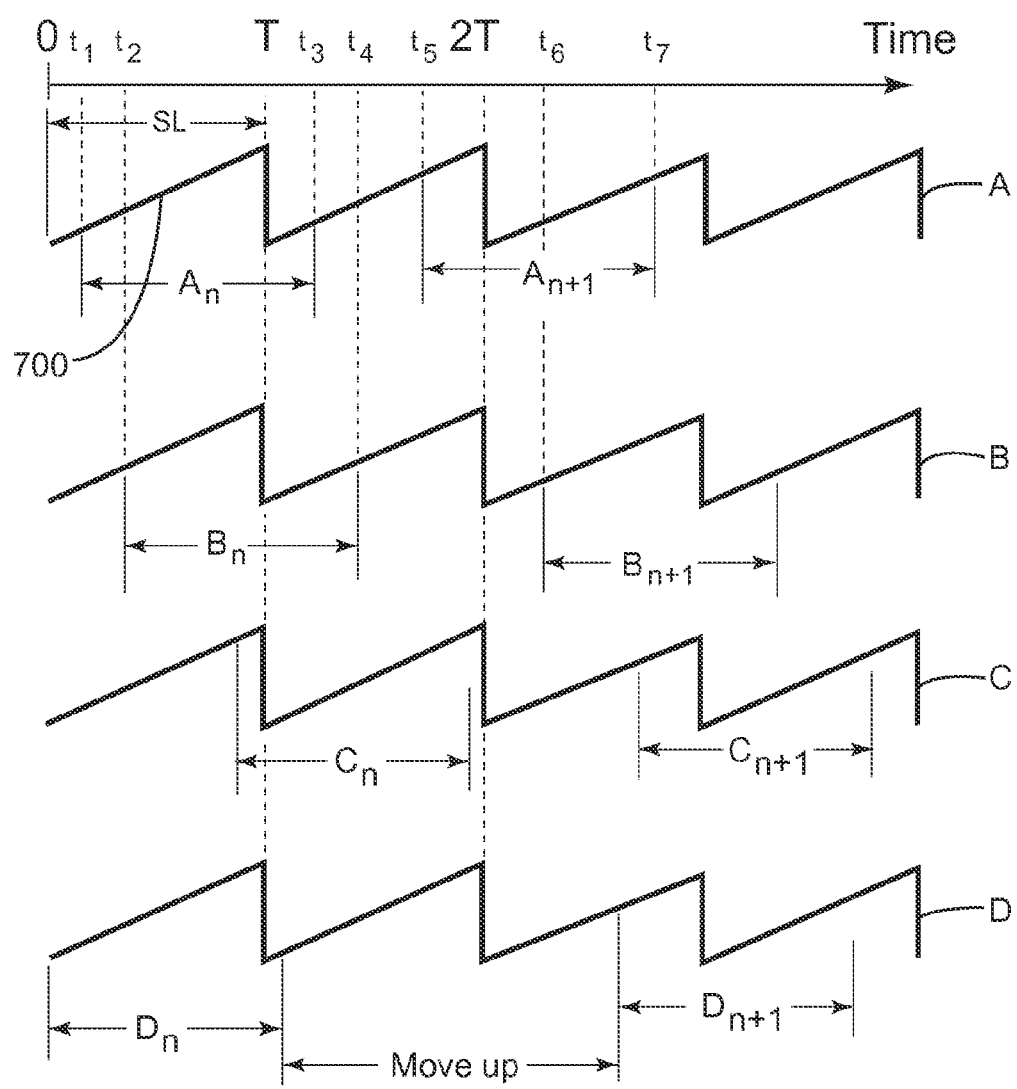
FIG. 7 is a graph illustrating pilot signal sequences to be used by vibratory sources according to an exemplary embodiment.

The four exemplary pilot signals (or sweeps) A, B, C and D are illustrated in FIG. 7. Each pilot signal is applied to only one of the vibrators 110-113 shown in FIG. 1. In the following, the vibrators 110-113 are used interchangeable with vibrators A-D. Further, it is considered that the pilot signals A-D shown in FIG. 7 are the master continuous sequences and the vibrators try to follow them to generate the seismic waves. However, it is known in the art that there are circumstances when the outputs of the vibrators differ from the master sequences A-D. FIG. 7 shows a temporal axis and the pilot signals A, B, C and D being synchronized with one another at all times and repeating continuously. These pilot signals have the cross-talk minimized over the listen time.

Although the pilot signals are illustrated in FIG. 7 as having the same shape, in fact they are different as shown in FIG. 4. The representation of the pilot signals in FIG. 7 is useful to show a few elements. The saw tooth pattern is used to schematically illustrate both the progression and synchronization of each pilot signal sequence in time and to highlight the repetition of each pilot signal sequence. These features are: (1) the pilot signals include a repetitive portion 700 of duration SL that extends from a time 0 to a time T, repeats T to 2T and so on; (ii) the temporal content of the repetitive portion for pilot signal A is different from the other pilot signals; (iii) the repetitive patterns for all the vibrators have the same predetermined sweep length SL; and, (iv) any vibrator can start its sweep at any time as long the vibrator sweeps for the predetermined sweep length SL. For example, FIG. 7 shows that a vibrator having the pilot signal A can start at a time t1 while the vibrator having the pilot signal B can start at a time t2, uncorrelated to t1. The same is true for the remaining vibrators. After the vibrator having the pilot signal A stops the sweep at time t3, where t3−t1=SL, the vibrator can start again the sweep at any time, for example, at a new starting time t5 and it continues until a new final time t7. In other words, the starting time for any vibrator is independent or arbitrary to the other vibrators and with respect to the master sweep frequency A or B or C or D. A time between two consecutive sweeps (t5−t3), for example, $A_n$ and $A_{n+1}$ is called the move-up time and it may correspond to a time necessary for moving the vibrator to another source point location. Further, the start times of the vibrators (e.g., t1 or t5) do not have to correspond to the times T, 2T, etc. that correspond to the beginning of the repetitive portion 700. It is noted that the seismic data acquisition system continuously record the seismic signals irrespective whether or not the vibrators are sweeping or moving-up.

The starting address of the sweep in the memory 502 of the vibrator 500 is computed (e.g., a pointer) using a universal clock such as the one provided by a Global Positioning System (GPS) receiver 504. A GPS receiver 504 may be installed in each vehicle carrying the vibrator. Thus, the vibrator electronics 506 executes the stored pilot signal from the calculated starting address up to the predetermined sweep length SL and simultaneously the vibrator controller 508 uses the pilot signal as a reference signal. The vibrator controller uses the pilot signal and feedback signals from the vibratory system to create a drive signal suitable for operating the servo-valve so that vibratory energy is produced by the hydraulic system. Typically, the drive signal is computed to compensate for the system dynamics so that the ground force signal produced is proportional to the pilot signal. When the vibrator electronics gets to the end of the table storing the pilot signal, it moves to the first entry and continues down until the excitation signal is stopped when that pointer has moved to the sweep entry address that immediately precedes the starting address. If only one sweep is to be executed per source point location, the vibrator then advances to the next source point location. If more than one sweep is to be executed per source point location, the vibrator remains in the same location and the vibrator electronics can be programmed to execute the desired number of sweeps with a listen time interval between each repetition.

Most seismic vibrators in use today employ hydraulic systems that use variable displacement pumps to provide the necessary hydraulic flow. In one application, the vibrator electronics is configured to apply an amplitude taper function for a predetermined time interval (typically in the range of 100 to 500 ms) at the start and end of each sweep. In this way, it is believed that amplitude tapers allow time for the hydraulic pump to respond more smoothly to changes in demand for flow when the sweep is initiated or ended.

All the pilot signals are also recorded in the recorder 510 and these too are synchronized to the GPS time as well. As part of the processing step, when daughter records are extracted, as will be discussed later, the recorded pilot signals need to be tapered in a way that agrees with what is happening in the vibrators.

Thus, each vibrator has vibrator control electronics, a GPS receiver, and a storage device for recording, preferably, both the pilot and ground force signals. Also, the vibrator may include a processor 512 for calculating the pilot sweep index pointer position from the GPS time when the vibrator is in position and the operator initiates the sweep. A telemetry system 514 suitable for receiving commands from the recording system or for transmitting source performance data to the recording system is also shown.

The recording system (for example, element 128 in FIG. 1) needs to also have a GPS receiver, a pilot sweep generator module (that generates the pilot signals A, B, C and D) and a device for synchronizing the pilot signals. Typically, the recording system includes a Quality Control system so that signals from the vibrator can be telemetered back to the recording system during the survey to ensure that the survey proceeds normally. Thus, the memory may store a few data channels of the repeated concatenated pilot sweeps. The recording system also includes a data acquisition system for not only recording the pilot signals but also the receiver data. This may be 10,000 data channels or more for recording geophone received data continuously or semi-continuously.

Data Acquisition

After the modified pilot signals have been downloaded into the memory of both the recording system-processing unit and the vibrator electronics, each vibrator electronics contains its unique modified weakly correlated pilot signal. Referring again to FIG. 1, the vibrator electronics for 110 would contain the pilot signal A, 111 would contain the pilot signal B, and so on.

Assume that the recorder truck is acquiring data continuously, when a vibrator is positioned at a desired source location, a start command for a vibrator may be initiated by the vibrator operator. For example, when unit 110 has reached its source location the operator can initiate a sweep. When unit 111 has reached its location it can begin and so on. The start time for units 110, 111, 112 and 113 can be the same or different. After receiving the start command, each unit 110, 111, 112, and 113 executes its respective modified weakly correlated pilot signal. Vibrators 110, 111, 112, and 113 vibrate and seismic energy is radiated into the earth. At the same time at least one measured signal is recorded for each vibrator that is representative of the energy it has produced and that is propagating into the earth and also the GPS time when the sweep began is logged. To facilitate the option to perform field correlation in the recording truck, preferably the GPS start times for each sweep is transmitted via radio link 514 from each vibrator to the recorder, thereby allowing the recorder to select the appropriate segment of the correct repeated pilot signal to be used as a correlation operator and to also select the appropriate portion of the receiver data for that shot point location. Receivers 120, 121, 122, 123, and 124 are linked to the recording system 128 and they receive the source energy after it has propagated through the earth, where the subterranean geologic features have affected it (represented by transfer functions 130, 131, 132, and 133 for receiver 120). All recorded signals may pass through some form of low pass anti-alias filter and the data is sampled and converted to a digital format through, for example, an analog-to-digital converter. Following conservative guidelines (sample rate is four-times the maximum frequency to be recovered), the signals for this example would be sampled at a 2-millisecond interval, since energy at or slightly above 100 Hz is to be recovered. In theory, the Nyquist sampling rate of twice the highest frequency to be recovered is all that should be required, but to ensure no spectral aliasing of the data some safety margin is usually observed resulting in the four-times rule. Anti-alias filters generally require some bandwidth to roll-off and are not brick-wall filters, so spectral room is required to allow for adequate attenuation of very high frequencies that might be present in the raw signal.

Figure 11:
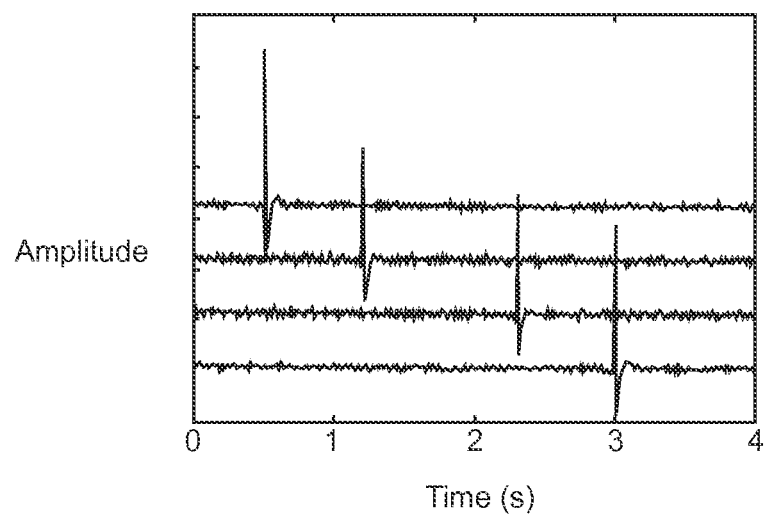
FIG. 11 illustrates a simulated composite received signal that has undergone intermediate separation by correlation with various pilot sweeps according to an exemplary embodiment.

The recorders may be equipped with a facility to perform correlation. The recording system operator has the option of recording the uncorrelated record, and/or correlating the record in the field and storing those results. The advantage to performing field correlation is that by analyzing results as the data is collected, problems can be identified and resolved early, thereby ensuring quality data. This also provides an opportunity to reevaluate and make adjustments to the survey parameters based upon any new information that has been gathered. Since the receiver signals are composite signals received from the four vibratory sources and it is desirable to correlate in the field to obtain an intermediate result (preliminary separation), the field processing unit will need to extract daughter records from the acquired mother record using timing data received from each vibrator via radio link (see step 208 in FIG. 2). Then correlate the selected data set four times, once for each source. The correlation operation compresses the data so that typically only that portion of the correlated record after the zero lag, but before the lag corresponding to the listen time length, is retained. For example, this might mean only about eight seconds of correlated data would be retained for each of the four derivative correlated records. In one application, the field correlation as just described would only be used for quality control purposes. Generally, uncorrelated data is required for implementation of enhanced separation and source signature removal; however, field correlated records could be used as an input for enhanced separation. If field correlated records are used, they will need to include both positive and negative time lag values that extend over at least twice the listen time. FIG. 11 shows results from a simulation where a geophone signal has been correlated with its corresponding pilot over the listen time, i.e., geophone signal correlated with pilot A at the top, followed by correlation with pilot B below it and so on.

For simplicity, it is assumed in the following that four sequences each 5-100 Hz, 56 s are concatenated to form four continuous master sequences A-D shown in FIG. 7. The sequences repeat at: 56 s, 122 s, 168 s ... It is also assumed a 6 s listen time and a 16 s move-up time for each truck with move-up allowed during the listen time. A single strong arrival from each source (linear earth model) is assumed. The same earth response each with a unique time delay was used for vibrators B, C and D even though during vibrator A's sweep the other vibrators may have actually changed locations for portions of their sweeps. The signal received at the receiver from each source is assumed to have the same amplitude spectrum.

It is noted that the master pilots A-D shown in FIG. 7 are for illustrative purposes. In other words, showing the master pilots being repeated over and over again is illustrative. In practice, this may only happen in the recording truck. For example, a desired master pilot may have a time length of sweep length (SL) which is stored in a pilot table. The source, in order to implement the master pilot, accesses the GPS time, calculates the sweep index pointer and accesses the corresponding point in the pilot table stored in the vibrator sweep generator memory. Then, from that starting address, the source proceeds through the table and then continues on to the start of the table and through the table until reaching the end of the SL (i.e., designated sweep length).

For example, assume that the sweep length is exactly 60 s and the system (sources and seismic recorders) was initialized so that the pilot signals in the recorder would repeat at the minute. The vibrator source could access the GPS time when the sweep was initiated and subtract it to extract how many seconds into the sweep it needed to start and then that could be divided by the sweep sample interval to find the starting point for that shot point. If the sweep duration is of some other duration, e.g., length SL and the sweep sample interval in seconds is dt, and everything was originally reference to 0:00:00.0000 hrs, then the controller of the source may be configured to take the GPS time, convert it to seconds, called GPS-seconds (include fractional parts) and then calculate N, where N represents the Nth element in the sweep table to begin initiate the sweep. In one exemplary embodiment, N=round {[(GPS-seconds/SL)−truncate(GPS-seconds/SL)]/dt}.

For some situations, for example, where high ambient noise is present, it may be desirable to execute multiple sweeps for each vibrator for the same source location. In this case, there is the option of combining multiple results from the execution of multiple sweeps for the same source location through a process called stacking. Stacking is essentially an averaging process.

The survey moves from source location to source location as the vibrators are moved with sweep initiations at each location. With each new position another record is produced. The data acquisition process continues until the survey is completed. At some point, the recordings are made available to the vibrator separation system 126. The recordings include not only the composite received signal data set, but also the recordings of the measured signals from each vibrator source.

Source Separation

Figure 8A:
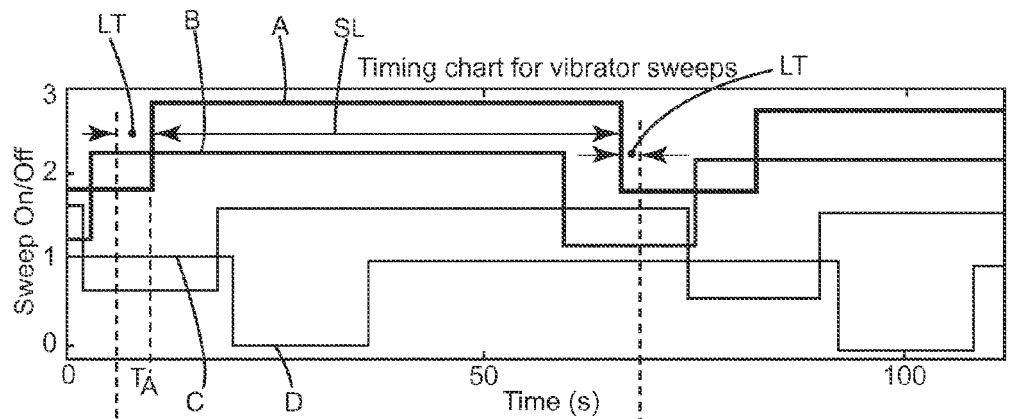
FIGS. 8A-C are graphs illustrating various starting times for the vibratory sources, a geophone signal from a mother record and the same geophone signal in a daughter record according to an exemplary embodiment.
Figure 8B:
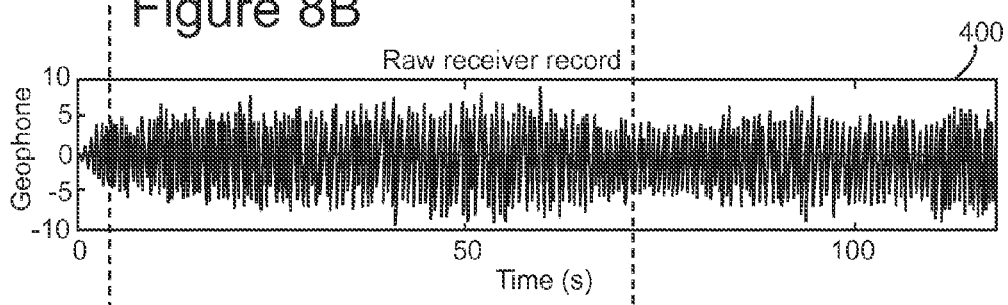
Figure 8C:
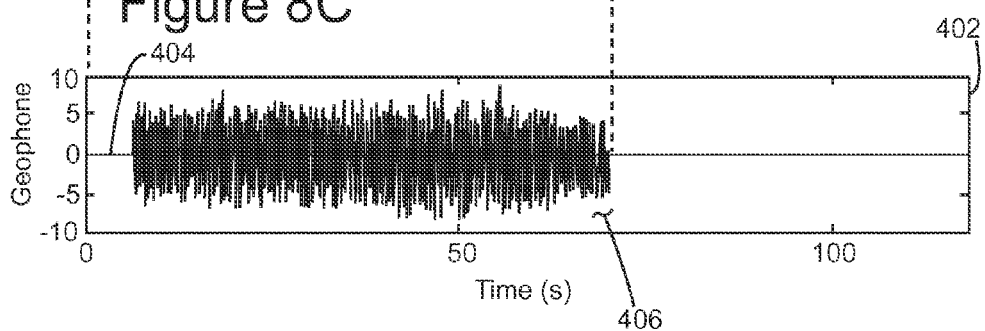

Having all this information, the separation system 126 is configured to separate the sources' signals as discussed next. FIGS. 8A-B show the timing for the execution of the four pilot signals A, B, C and D and a raw receiver record 400 (mother receiver record) recorded by a geophone. A portion of the raw receiver record, i.e., the "mother" receiver record is windowed. Assume that the contribution of vibrator A is now solved. The windowed portion extends over the interval (Ta−LT, Ta+SL+LT) and forms the "daughter" record 402 as shown in FIG. 8C. The Ta is the start time for vibrator A, LT is the listen time (6 s for this example) and SL is the sweep length. Then, the first LT seconds of the geophone signal in the daughter record are muted out (see region 404) because the earth is causal in its response and there is no expectation to have received any signal from vibrator 110 prior to the time selected for the daughter record to begin. In addition, the end portion 406 of the daughter record is zero padded to the desired overall length to avoid wrap-around issues associated with correlation in the frequency domain.

The pilot and ground force signals for vibrators B, C, and D are formed in different ways. In other words, the pilot and ground force signals are not muted for the first LT seconds for vibrators B, C, and D. However, the portions of B, C and D control signals and ground force signals that occur after A stops sweeping were muted.

Then, the process performs spectral division using the same correlation, windowing and matrix method as in '945. One difference between '945 and the present method is that the white noise level added to the source separation matrix is larger for some of the diagonal elements of the separation matrix. More specifically, the white noise added to the main diagonal is higher for elements corresponding to vibrators B, C and D than for vibrator A. A weighted least squares method may be another approach to consider. The same procedure can be repeated to separate vibrators B, C and D.

Figure 9:
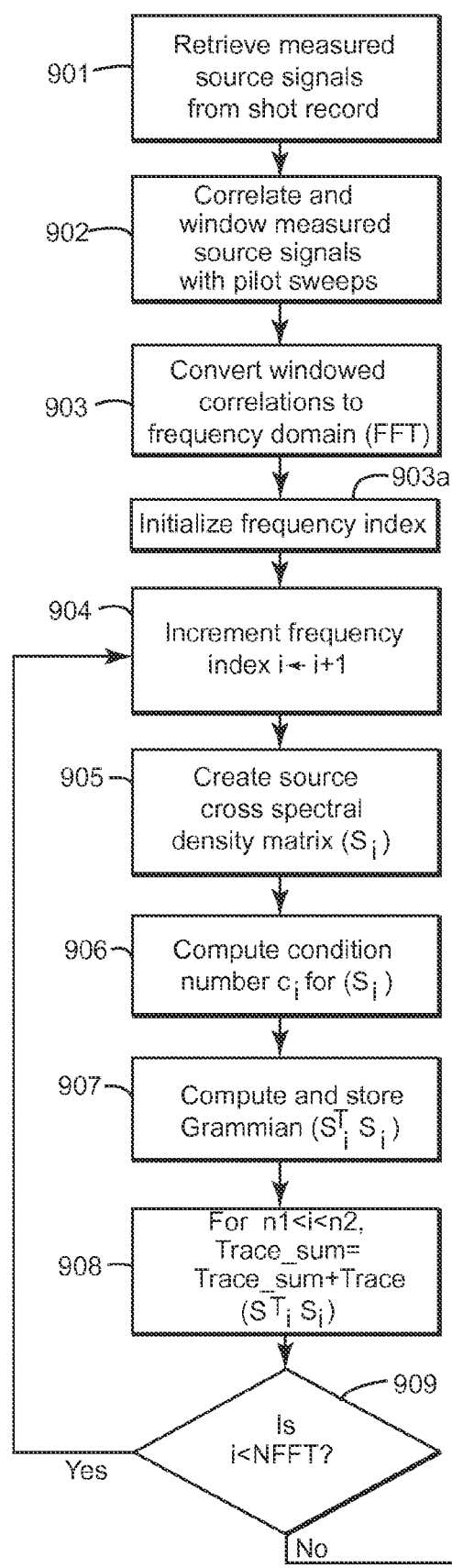
FIG. 9 is a flowchart showing how the source separation matrix is formed.
Figure 10:
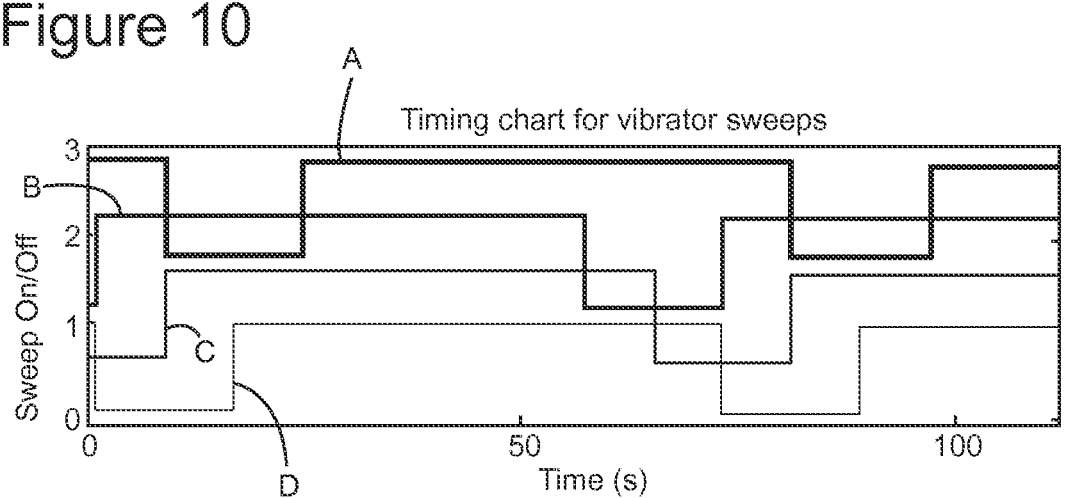
FIG. 10 is graphs illustrating various starting times for the vibratory sources according to an exemplary embodiment.

The procedure is now discussed in more detail. Turning to FIG. 9, a flow chart describing the various steps involved in forming a source cross-spectral density matrix S and its inverse, and the source separation matrix W are shown. This process will be applied once for each source location record. For simplicity, the method is illustrated for a case in which four vibrators are used. The four vibrators start asynchronously, i.e., the starting times are Ta=25 s, Tb=1 s, Tc=9 s and Td=17 s. A listen time SL is 6 s, a sweep length SL is 56 s and a move-up time is 16. For these values, FIG. 10 illustrates the four pilot signals A to D and the start times Ta-d for the four vibrators.

Figure 12A:
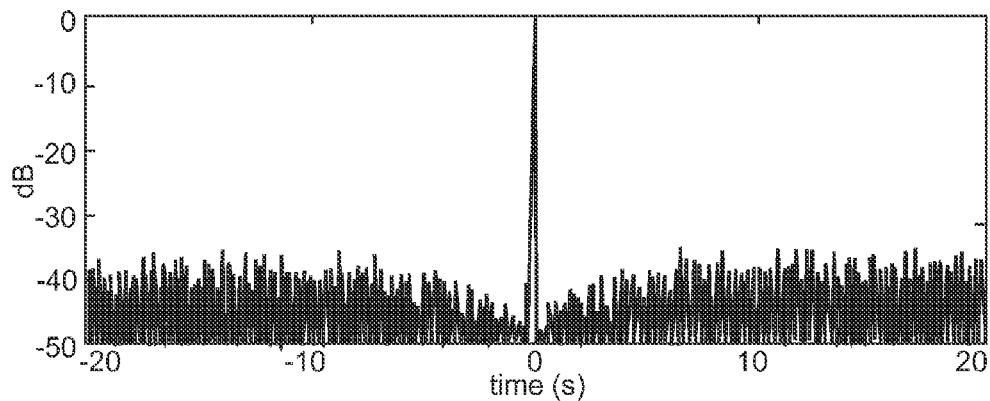
FIGS. 12A-D illustrate cross-correlation of vibrator measured signals with a pilot signal according to an exemplary embodiment.

The measured source signals corresponding to the pilot signals A, B, C, and D are retrieved in step 901. Each source signal is then cross-correlated with each pilot sweep signal A, B, C and D in step 902. FIGS. 12A-D show results from a simulation where every measured source signal has been correlated with the pilot A sweep, i.e., measured signals corresponding to vibrators A, B, C and D are correlated with Pilot A. FIGS. 12A-D are magnitude displays converted to a dB scale. FIG. 12A is a view of the measured signal from vibrator A correlated with Pilot A and so it will have a strong peak at time zero since these signals should be highly correlated.

Figure 12B:
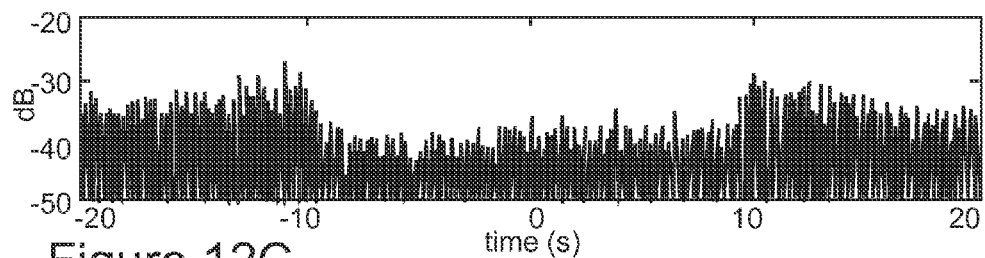
Figure 12C:
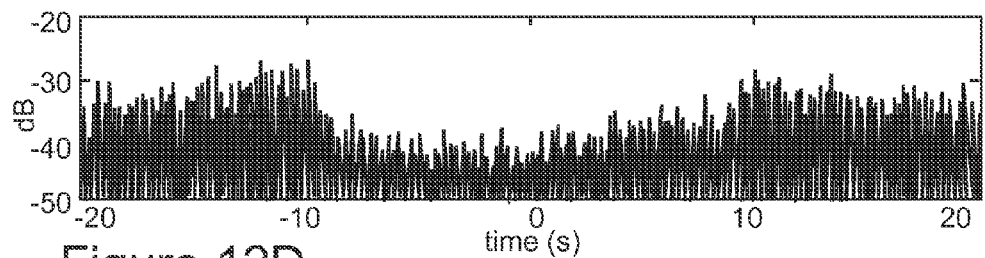
Figure 12D:
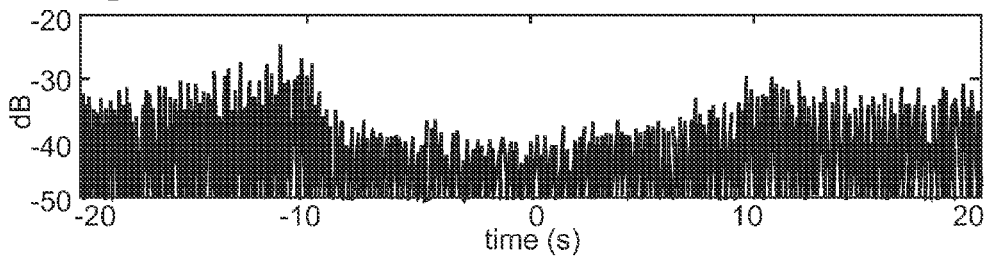

FIGS. 12B-D offer a view of the source cross talk noise. The traces have all been normalized to the peak of the top trace and displayed separately from one another so as not to interfere. It is noted that in this display, correlation was performed in the frequency domain. FIGS. 12B-D show that the correlation cross-talk mitigation interval has been preserved over the interval of +/−listen time to some extent even though sources started at different times. In a subsequent step, the cross-correlated measured signals are windowed over +/−listen time. Additionally, the source signature window is smoothly tapered at its edges to avoid any sharp corners that might produce unwanted artifacts. When the source signature window is applied in the time domain to the various source cross-correlations with the various pilot sweeps, values that lie outside this window are set to zero and the window is gently tapered to avoid abrupt corners. As can be seen in FIGS. 12B-D, there is a quiet zone in the cross-correlations corresponding to the region that has been decoupled, and that same time interval falls inside the source signature window. Next, in step 903a a frequency index is initialized and in step 903, a fast Fourier transform (FFT) for each windowed source cross-correlation is calculated and results stored. Next, steps 904 through 909 calculate and store the grammian $S_i^T \cdot S_i$ for each frequency. The elements of S are formed from the FFT values stored in step 903. Steps 904 through 909 form a computational loop whereby each frequency increment (step 904) of the grammian $S_i^T \cdot S_i$ is calculated and stored in step 907. The total source power over the frequency band of interest is also computed by summing the grammian trace values in step 908. The elements of S are formed from the FFT values stored in step 905 and in step 906. Steps 904-908 are repeated until all frequencies are evaluated in step 909. In step 910 a pre-whiting filter is calculated and in step 910a a frequency index is initialized. Steps 911-913 form a second computational loop to compute the source separation matrix for each frequency increment. For each frequency index in step 911, the source separation matrix of the form $W_i = [S_i^T S_i + Q]^{-1} [S_i^T]$ is computed in step 912 and stored in step 913. Q is a diagonal matrix with diagonal elements corresponding to the white noise. It is noted that step 912 is similar to what is described in '945 but with a novel difference. The white noise in '945 has the same white noise (denoted as "U"). Thus, the same white noise is added to each term on the main diagonal in '945, while in this exemplary embodiment the white noise term (denoted as "Q") is higher for elements corresponding to vibrators B, C and D than for vibrator A. In step 913, the process loops back to step 911 until all frequencies are considered.

In step 915, the vector of condition numbers may be displayed versus frequency. Condition numbers provide an indication of the quality of the source separation for a given frequency. Condition numbers in excess of 10 may indicate problem frequencies or bad source performance and processing personnel may elect to discard or edit the shot record.

The separation process is illustrated in FIG. 13. This is basically a two-part separation. An initial separation by correlation followed by a second separation using the measured source signals that have been incorporated into formation of the source separation matrix W above. The second separation also includes source signature removal. This next phase of the method begins with retrieval of a composite received signal in step 1301. If the composite received signal has already been correlated in the field, the method advances to step 1303. If the data set is uncorrelated, the composite received signal is correlated with the pilot sweeps and windowed in step 1302.

Again, FIG. 11 shows a simulation result after a single composite received signal has been correlated with each source pilot sweep signal. For the present exemplary embodiment, the signal composite received signal becomes four separated signals—this is an intermediate separation. A window is centered near the midpoint of the listen time that is wide enough to span at least the entire listen time. Correlated composite received signal data outside the window is zeroed out and the four windowed correlations are transformed into the frequency domain using an FFT and the results are stored in an array.

Steps 1303a through 1309 of FIG. 13, illustrate a computational loop whereby at each frequency increment (index "i"), a receiver cross spectral density vector ("R") is formed and that vector R is then multiplied by its corresponding source separation matrix W, the resultant being a vector H that contains the spectral representation of the fully separated composite received signal data at frequency increment "i". For the example case, the array H will have "Ns" rows each of length NFFT, where "Ns" is the number of sources. For the present case "Ns" is 4. Further, the notation $H_i^n$ will be used, where "i" is the "ith" frequency and "n" is the "nth source." The first row element corresponds to the spectral component of the transmission path response (transfer function) from vibrator 110 to receiver 120, the second row element corresponds to the spectral component of the transmission path response from vibrator 111 to receiver 120, and so on. After the various transfer function estimates have been separated and estimated in the frequency domain, all of the first row elements of H or $H^1$ are passed into an array and transformed back into the time domain, in steps 1309a to 1313, using an inverse FFT (IFFT) with that result being the transmission path response 130 for the present example, all of the second row elements of H or $H^2$ are passed into an array and transformed back into the time domain using an IFFT with that result being the transmission path response 131 for the present example, and so on. At this point the separation process is complete for receiver 120 and the first shot record. The process illustrated in FIG. 13 is repeated for each receiver recorded for a particular shot and the results are stored in step 1314.

Figure 14:
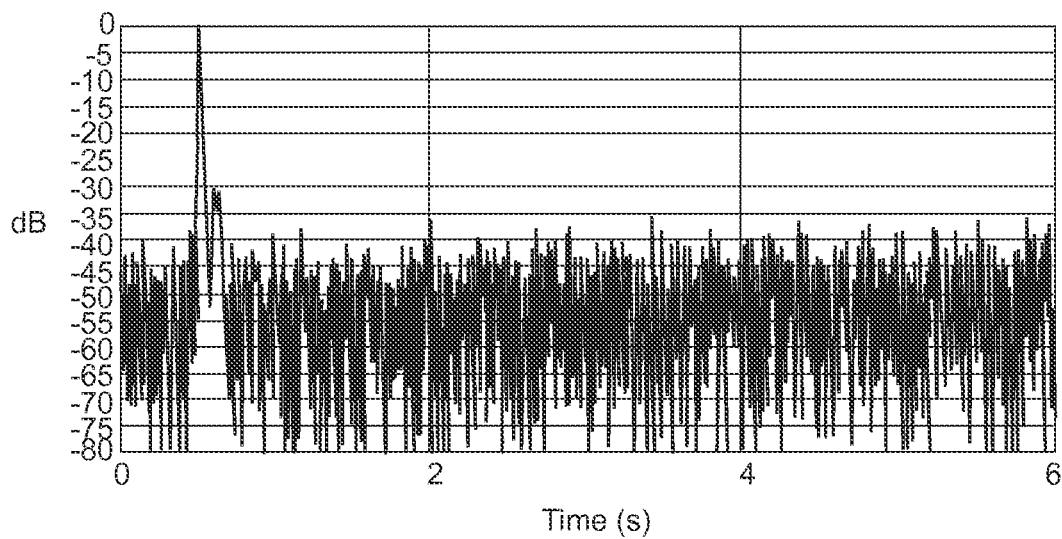
FIG. 14 illustrates a normalized magnitude impulse response from a vibrator after final separation according to an exemplary embodiment.
Figure 15:
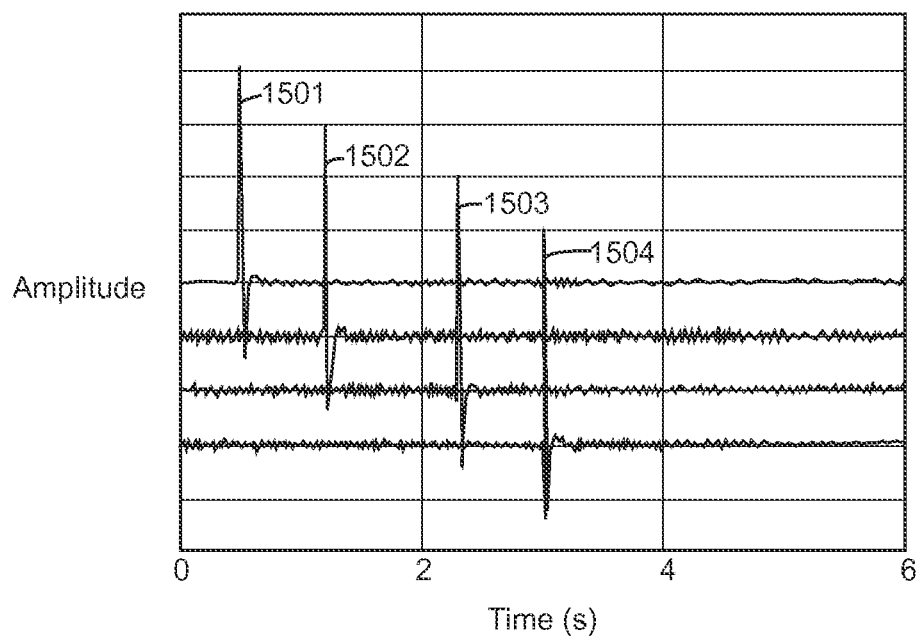
FIG. 15 is a graph illustrating earth impulse response estimates after source measurement corrections have been applied according to an exemplary embodiment.

FIG. 14 shows the magnitude of the impulse response from vibrator A on a dB scale after final separation and FIG. 15 shows the final separation result that includes peaks 1501 to 1504. Only the response for vibrator A (1501) is retained from the graph shown in FIG. 15. So in fact the steps 1310 through 1313 could be replaced by a single iteration where we only solve for the earth impulse response corresponding to the selected vibrator (Vibrator A or n=1 for the example case), instead of incrementing "n" to recover all four responses. The mother record will need to be edited again to retrieve the portions for vibrators B, C and D.

For purposes of this discussion, the composite receiver signal can be taken to mean the recorded receiver signal affected only by the recording system filters or a modified version of that receiver signal that has gone through some form of ambient nose removal. Some common noise sources that might be mitigated in processing prior to separation might include, but not limited to, electromagnetic or vibrational interference from nearby transmission lines or transformers, noise bursts created by traffic along a nearby road or aircraft flying overhead, wind gust noise, pumping noises from pump jacks operating nearby or other oilfield machinery, and vibrational noise cause by fluid flow through nearby pipelines.

It is anticipated that other methods can be employed to solve the system of equations described above and these cases are discussed in '945. In other words, FIGS. 9 and 13 describe one possible approach for calculating the separation matrix and transfer functions. Those skilled in the art would recognize that other methods may be used for handling asynchronous vibrator activation.

Figure 16:
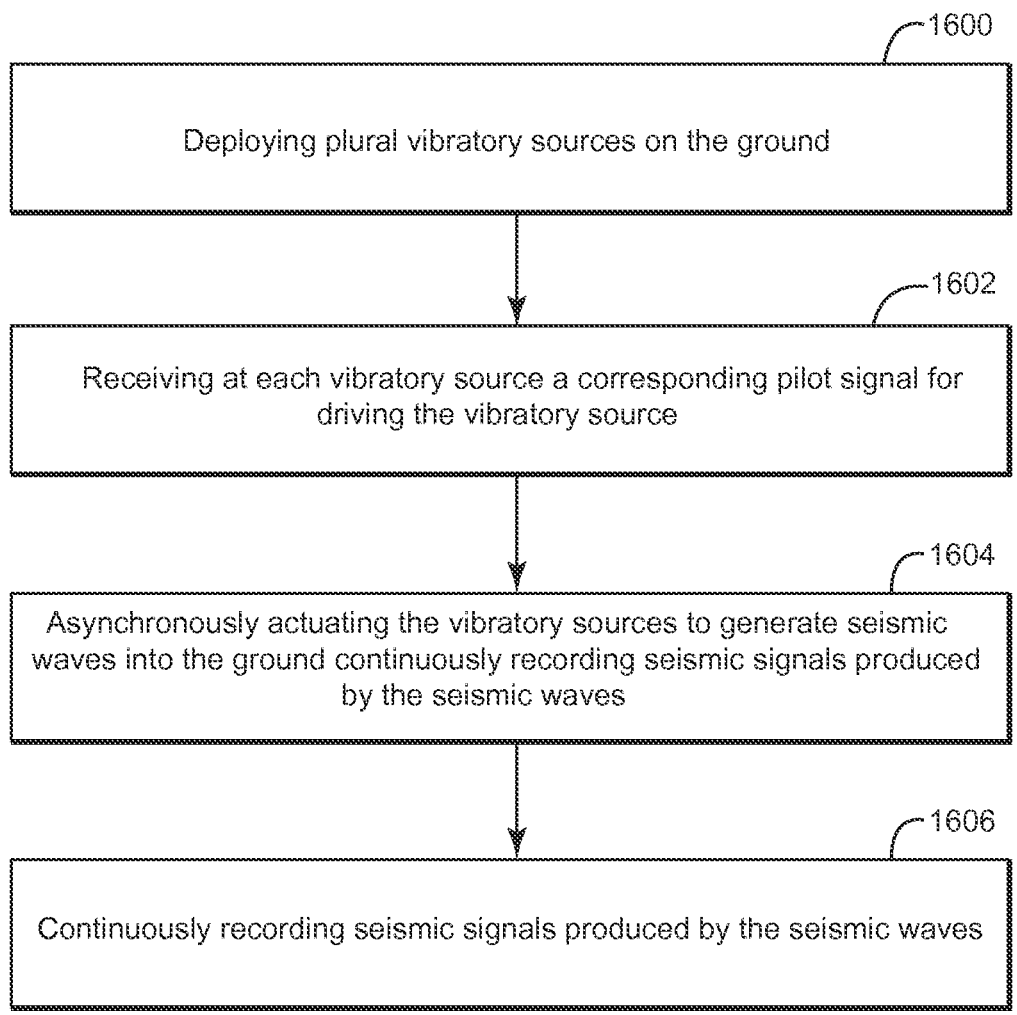
FIG. 16 is a flowchart of a method for seismic prospecting according to an exemplary embodiment.

According to an exemplary embodiment, illustrated in FIG. 16, there is a method for seismic prospecting. The method includes a step 1600 of deploying plural vibratory sources on the ground; a step 1602 of receiving at each vibratory source a corresponding pilot signal for driving the vibratory source; a step 1604 of asynchronously actuating the vibratory sources to generate seismic waves into the ground; and a step 1606 of continuously recording seismic signals produced by the seismic waves. The pilot signals for the plural vibratory sources are spectrally shaped into continuous pseudorandom sequences that have been formed in such a way that they are weakly correlated over a predetermined time interval, typically of a length equal to twice the listen time.

Figure 17:
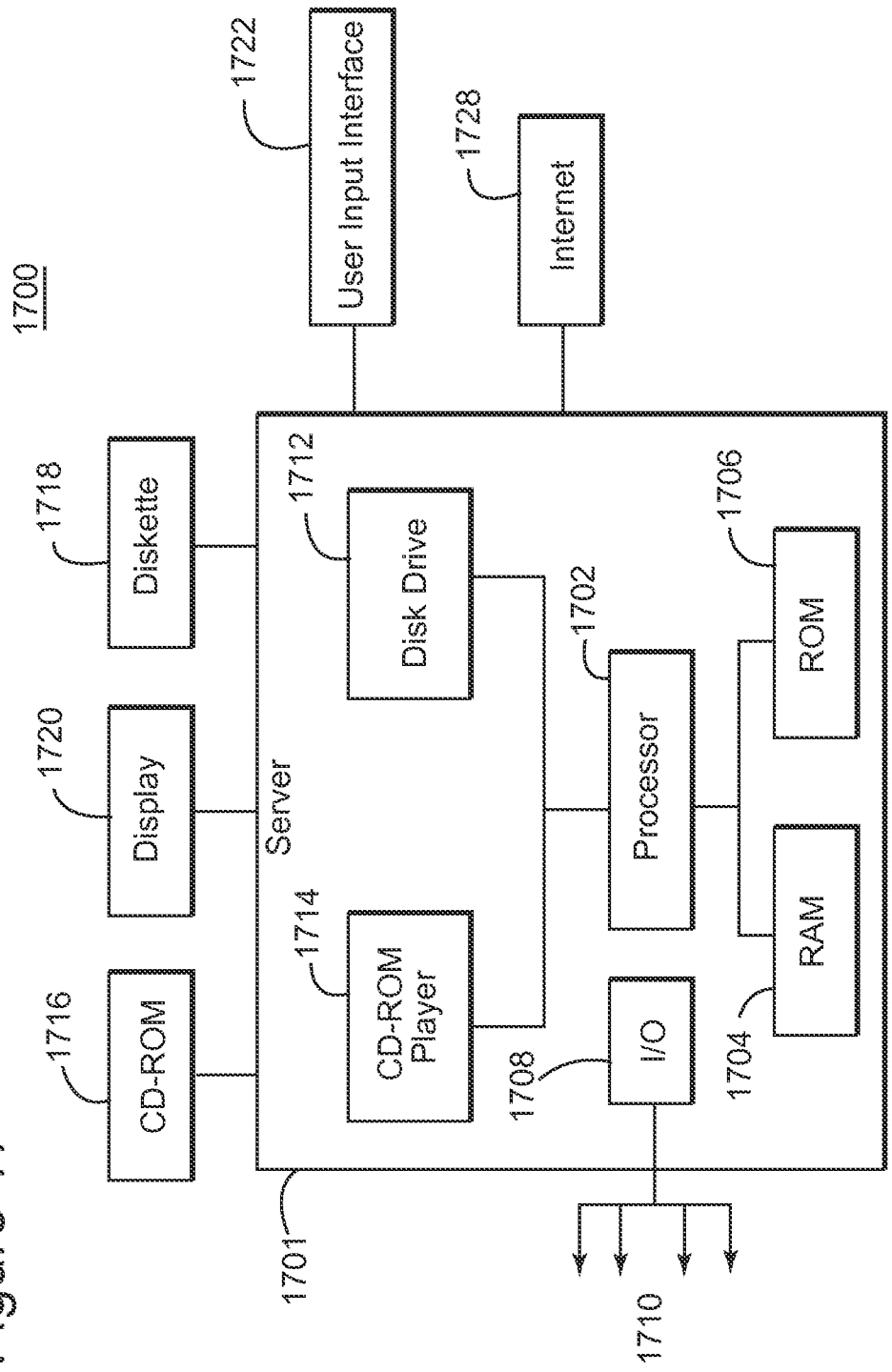
FIG. 17 is a schematic diagram of a computing device capable to implement one or more of the methods discussed in the exemplary embodiments.

The above method and others may be implemented in a computing system specifically configured to calculate the source separation matrix. An example of a representative computing system capable of carrying out operations in accordance with the exemplary embodiments is illustrated in FIG. 17. Hardware, firmware, software or a combination thereof may be used to perform the various steps and operations described herein. The computing system may be one of elements 126, 128 and 129 or may be implemented in one or more of these elements.

The exemplary computing system 1700 suitable for performing the activities described in the exemplary embodiments may include server 1701. Such a server 1701 may include a central processor (CPU) 1702 coupled to a random access memory (RAM) 1604 and to a read-only memory (ROM) 1706. The ROM 1706 may also be other types of storage media to store programs, such as programmable ROM (PROM), erasable PROM (EPROM), etc. The processor 1702 may communicate with other internal and external components through input/output (I/O) circuitry 1708 and bussing 1710, to provide control signals and the like. The processor 1702 carries out a variety of functions as is known in the art, as dictated by software and/or firmware instructions.

The server 1701 may also include one or more data storage devices, including a hard drive 1712, CD-ROM drives 1714, and other hardware capable of reading and/or storing information such as DVD, etc. In one embodiment, software for carrying out the above discussed steps may be stored and distributed on a CD-ROM 1616, removable memory device 1718 or other form of media capable of portably storing information. These storage media may be inserted into, and read by, devices such as the CD-ROM drive 1614, the disk drive 1712, etc. The server 1701 may be coupled to a display 1720, which may be any type of known display or presentation screen, such as LCD displays, LED displays, plasma display, cathode ray tubes (CRT), etc. A user input interface 1722 is provided, including one or more user interface mechanisms such as a mouse, keyboard, microphone, touch pad, touch screen, voice-recognition system, etc.

The server 1701 may be coupled to other computing devices, such as the landline and/or wireless terminals via a network. The server may be part of a larger network configuration as in a global area network (GAN) such as the Internet 1728, which allows ultimate connection to the various landline and/or mobile client devices. The computing device may be implemented on a vehicle that performs a land seismic survey.

The disclosed exemplary embodiments provide a system and a method for actuating sources asynchronously. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for seismic prospecting, the method comprising:
deploying plural vibratory sources on the ground;
receiving at each vibratory source a corresponding pilot signal (A) for driving the vibratory source;
asynchronously actuating the vibratory sources to generate seismic waves into the ground; and
continuously recording seismic signals produced by the seismic waves,
wherein the step of asynchronously actuating includes,
accessing an accurate time;
calculating a sweep index pointer;
accessing a corresponding start point in the pilot signal;
actuating the source from the corresponding start point;
proceeding through the pilot signal from the corresponding start point to a final point of the pilot signal; and
continuing to proceed through a beginning of the pilot signal for a predetermined sweep length, and
wherein pilot signals (A-D) for the plural vibratory sources are obtained by spectrally shaping starting sequences into continuous pseudorandom sequences that are weakly correlated over a predetermined time interval.

2. The method of claim 1, further comprising:
modifying the starting sequences so that a cross-talk between all of them is minimized for the predetermined time interval,
wherein the predetermined time interval is at least twice a listen time.

3. The method of claim 1, further comprising:
synchronizing all the pilot signals with respect to one another so that beginnings (nT) of the sweeping portions for different pilot signals (A-D) are aligned in time.

4. The method of claim 3, further comprising:
using a same sweeping length (SL) for all vibratory sources.

5. The method of claim 1, further comprising:
starting a vibratory source at a starting time (Ta), independent of starting times (Tb-d) of other vibratory sources.

6. The method of claim 4, further comprising:
actuating the vibratory source for a predetermined sweeping length (SL), from the starting time (t1) to a final time (t3), wherein the final time (t3) is given by a sum of the starting time (t1) and the predetermined sweeping time (SL).

7. The method of claim 6, further comprising:
moving the vibratory source to a new position after the final time (t3).

8. The method of claim 7, further comprising:
actuating again the vibratory source from a new starting time (t5) to a new final time (t7) on the pilot signal (A), wherein the new final time (t7) is given by a sum of the new starting time (t5) and the predetermined sweeping length (SL).

9. The method of claim 8, wherein the new starting time (t5) is given by a sum of the final time (t3) and a moving-up time (t5–t3), the moving-up time being a time necessary for moving the vibratory source to the new position.

10. A controller configured to control a vibratory source deployed on the ground for seismic prospecting, the controller comprising:
an interface configured to receive a corresponding pilot signal for driving the vibratory source; and
a processor connected to the interface and configured to asynchronously actuate the vibratory source to generate seismic waves into the ground,
wherein the pilot signal for the vibratory source is obtained by spectrally shaping a corresponding starting sequence and other starting sequences associated with other vibrators into continuous pseudorandom sequences that are weakly correlated over a predetermined time interval, and
wherein the processor is further configured to:
access an accurate time;
calculate a sweep index pointer;
access a corresponding start point in the pilot signal;
actuate the source from the corresponding start point;
proceed through the pilot signal from the corresponding start point to a final point of the pilot signal; and
continue to proceed through a beginning of the pilot signal for a predetermined sweep length.

11. The controller of claim 10, wherein the starting sequences are modified so that a cross-talk between all of them is minimized for the predetermined time interval, and the predetermined time interval is twice a listen time.

12. The controller of claim 10, wherein the processor is further configured to:
start the vibratory source at a starting time, independent of other vibratory sources.

13. The controller of claim 12, wherein the processor is further configured to:
actuate the vibratory source for a predetermined sweeping time, from the starting time to a final time, wherein the final time is given by a sum of the starting time and a predetermined sweeping time, which is the same for all vibratory sources.

14. The controller of claim 13, wherein the processor is further configured to:
actuate again the vibratory source from a new starting time to a new final time on the pilot signal, wherein the new final time is given by a sum of the new starting time and the predetermined sweeping time.

15. The controller of claim 14, wherein the new starting time is given by a sum of the final time and a moving-up time, the moving-up time being a time necessary for moving the vibratory source to a new position.

16. A non-transitory computer readable medium including computer executable instructions, wherein the instructions, when executed by a processor, implement a method for seismic prospecting, the medium including instructions for:
receiving at each vibratory source a corresponding pilot signal for driving the vibratory source;
asynchronously actuating the vibratory sources to generate seismic waves into the ground; and
continuously recording seismic signals produced by the seismic waves, wherein pilot signals for the plural vibratory sources are obtained by spectrally shaping starting sequences into continuous pseudorandom sequences that are weakly correlated over a predetermined time interval,
wherein the step of asynchronously actuating includes,
accessing an accurate time;
calculating a sweep index pointer;
accessing a corresponding start point in the pilot signal;
actuating the source from the corresponding start point;
proceeding through the pilot signal from the corresponding start point to a final point of the pilot signal; and
continuing to proceed through a beginning of the pilot signal for a predetermined sweep length.

* * * * *